(12) United States Patent
Shah et al.

(10) Patent No.: US 10,007,847 B2
(45) Date of Patent: Jun. 26, 2018

(54) AUTOMATIC POSITIONING OF A VIDEO FRAME IN A COLLAGE CELL

(71) Applicant: Adobe Systems Incorporated, San Jose, CA (US)

(72) Inventors: Abhishek Shah, Pitam Pura (IN); Sameer Bhatt, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 84 days.

(21) Appl. No.: 15/286,867

(22) Filed: Oct. 6, 2016

(65) Prior Publication Data

US 2018/0101731 A1   Apr. 12, 2018

(51) Int. Cl.
| | | |
|---|---|---|
| G06K 9/00 | (2006.01) | |
| H04N 5/265 | (2006.01) | |
| G06T 7/00 | (2017.01) | |
| H04N 5/262 | (2006.01) | |
| G11B 27/00 | (2006.01) | |

(52) U.S. Cl.
CPC ........ *G06K 9/00744* (2013.01); *G06T 7/0042* (2013.01); *H04N 5/265* (2013.01); *H04N 5/2628* (2013.01)

(58) Field of Classification Search
USPC ....... 382/100, 103, 106–107, 154, 162, 168, 382/173, 181, 190, 199, 209, 219–220, 382/224, 232, 254–255, 276, 285–291, 382/305; 386/280, 278, 282; 348/231.2
See application file for complete search history.

(56) References Cited

U.S. PATENT DOCUMENTS

| | | | | |
|---|---|---|---|---|
| 7,369,164 | B2 * | 5/2008 | Parulski | G06F 17/3028 348/231.2 |
| 7,480,864 | B2 * | 1/2009 | Brook | G06F 17/30843 386/278 |
| 8,903,224 | B1 * | 12/2014 | Shah | G11B 27/34 386/278 |
| 2013/0129156 | A1 * | 5/2013 | Wang | G06T 7/20 382/107 |
| 2014/0199049 | A1 * | 7/2014 | Shah | H04N 5/76 386/280 |
| 2014/0219636 | A1 * | 8/2014 | Shah | H04N 9/87 386/282 |

* cited by examiner

*Primary Examiner* — Seyed Azarian
(74) *Attorney, Agent, or Firm* — Finch & Maloney PLLC

(57) ABSTRACT

A computer-implemented method of positioning a video frame within a collage cell includes, for a given one of a plurality of video frames, generating a polygon encompassing a portion of the respective video frame containing at least one visual element. The polygon has a center position corresponding to a first point within the respective video frame. The center position of the polygon of a given frame is then changed to a new center position based at least in part on an average center position of polygons encompassing portions of at least two consecutive video frames containing the visual element(s). The new center position corresponds to a second point within the given video frame. Next, a cropped portion of the given video frame encompassed by the polygon having the new center position is generated and displayed within a collage cell of a graphical user interface.

17 Claims, 15 Drawing Sheets

Original Video Frame

Scene from *His Girl Friday* (1940)

Letter Box Effect

Crop Effect

AUTOMATIC POSITIONING OF A VIDEO FRAME IN A COLLAGE CELL

FIELD OF THE DISCLOSURE

This disclosure relates generally to digital media processing, and more particularly, to techniques for automatic positioning of a digital video within a collage cell of a graphical user interface.

BACKGROUND

Collections of digital media content, including still images, animated graphics and full-motion videos, can be presented as a collage in which multiple sources of content are displayed simultaneously in individual cells of the collage, such as shown in the example collage of FIG. 1 (cells 102, 104, and 106). In such a collage, the content may need to be adjusted accommodate the size and shape of each cell. For example, the content may be stretched or compressed to fit into the collage cell, although such techniques can cause visual distortions of the content. To avoid such distortions, the original aspect ratio of the content can be maintained by proportionally resizing the content to fit within the collage cell (e.g., by changing the zoom or magnification level). When resizing causes the content to be smaller than the collage cell, so-called letter or pillar boxing techniques can be used to fill the portions of the cell not containing the content with a solid or patterned background (e.g., black bars). However, depending on the size of the cell, resizing the content at its original aspect ratio to fit within the cell may cause the content to become very small and thus difficult to view, or may cause portions of the content to be cropped out of view. Therefore, there is a need for improved techniques for placing content within a collage cell.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
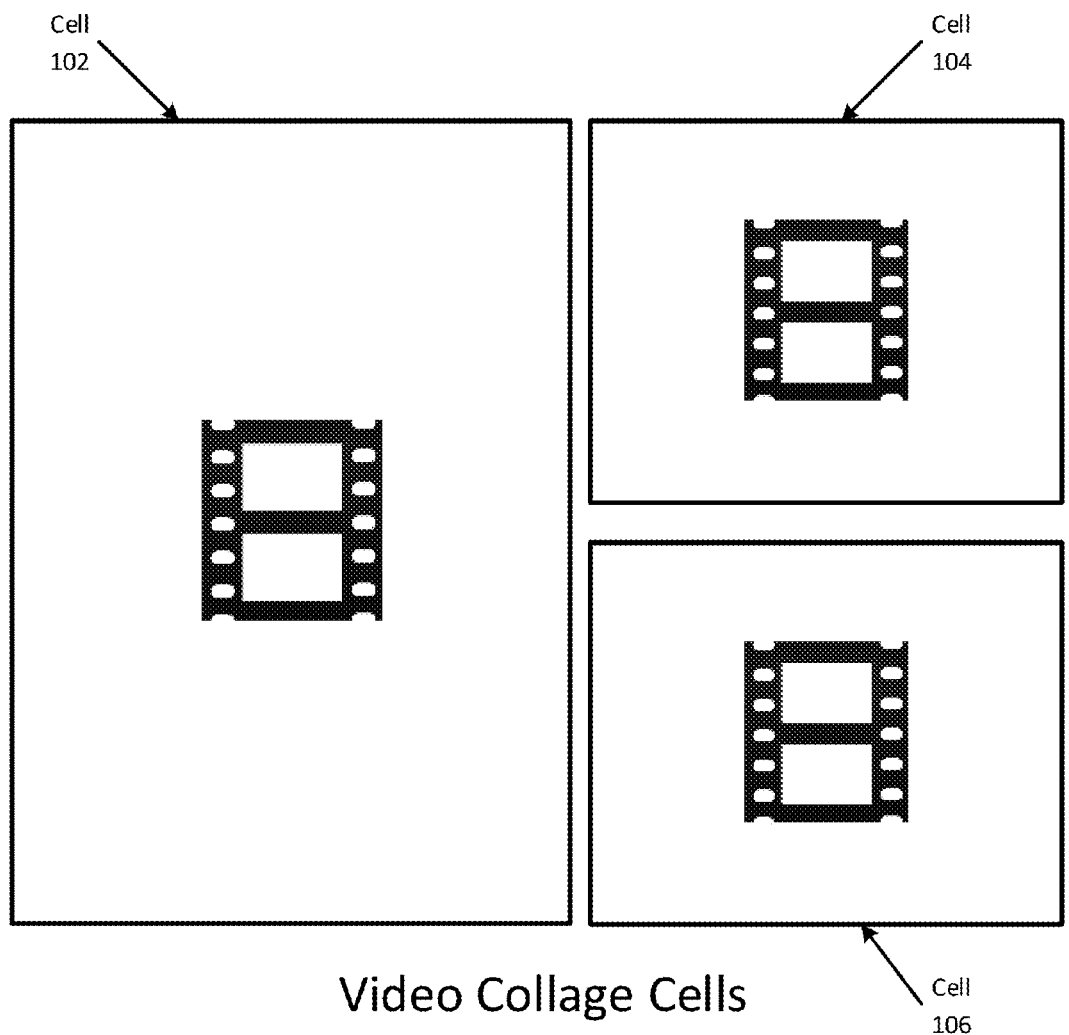
FIG. 1 shows an example of a video collage having several individual cells for displaying videos or other media content.

Some existing techniques for positioning a video in a collage cell require the user manually align and adjust the position of each frame, which is a time-consuming and cumbersome process. Furthermore, such a manual process can cause the position of the video within the collage cell to change erratically from frame to frame, creating an undesirable jerkiness during playback. In contrast to such existing techniques, embodiments disclosed herein allow users to quickly and easily position videos or other media content in a collage, and to create engaging digital media that has no letter or pillar boxing effects, that displays certain portions of each video frame in the collage cell, and has few disruptions or jerks between frames in the final output. The displayed portions of the video frame may include, for example, portions that include human faces, static objects, moving objects and other activity, or anything that is intended to be the main subject(s) of the video.

Techniques are disclosed for a computer-implemented method of positioning a video, image, or other content within a predetermined and fixed region of a graphical user interface, such as a collage cell. Embodiments herein will be described with reference to video placed within collage cells, but such embodiments should not be considered limiting as the described concepts are equally applicable to any type of visual content to be placed in any type of predetermined or fixed size frame.

According to an embodiment of the present disclosure, for each of a plurality of video frames, one or more polygons are generated encompassing one or more portions of the respective video frame containing at least one visual element. Each polygon contains one or more visual elements. The visual element may include, for example, a human face, an object visible in each of the frames, movement or activity, or more generally, any portion of the frame containing a visual element of potential interest to the user. The faces and objects may be static (e.g., the face or object does not appear to move) or dynamic (e.g., the face or object appears to move). The polygon encompassing the visual element can be a rectangle or square, but any other polygon can be used. In some cases, where the frame includes more than one visual element, separate polygons are generated encompassing each respective portion of the frame containing the visual elements. The separate polygons may or may not overlap, depending on the location of the visual elements in the video frame. Any number of existing object detection or recognition algorithms can be used to identify the visual element. Such algorithms may include, for example, gradient-based and derivative-based matching, template matching, image segmentation, Viola-Jones object detection, bag-of-words image classification, or any other suitable object detection or recognition technique. Alternatively, the visual element can be selected manually by the user.

In cases where more than one polygon is generated for a video frame, a so-called minimum polygon can be generated that encompasses all of the polygons. However, if there is only one polygon for a video frame, then that polygon is considered the minimum polygon for the frame. The minimum polygon is the smallest polygon that can be drawn to encompass all polygons for the faces, objects and activity in a given video frame. The minimum polygon has a center position corresponding to a first point within the respective video frame. In an embodiment, the area of the minimum polygon is less than or equal to the area of the collage cell in which the video is to be displayed.

A minimum polygon is generated for all faces, objects and activity in each frame of the video. The position of the minimum polygon relative to a given video frame is then adjusted by changing the center position of the minimum polygon for the given video frame to an average center position of the minimum polygons encompassing portions of two or more consecutive video frames containing the same visual element(s) (including the minimum polygon of the given video frame). The center position of the adjusted minimum polygon corresponds to a second point within the given video frame, which may be the same as the first point, or a different point within the frame. The center position of the adjusted minimum polygon may, for example, be coincident with a center position of the respective collage cell. Next, a cropped portion of the given video frame is generated. The cropped portion of the video frame is encompassed by the adjusted minimum polygon. The cropped portion of the video frame can then be displayed within a collage cell of a graphical user interface. In some embodiments, a magnification (plus or minus) of the given video frame is adjusted such that the cropped portion extends to at least one edge of the respective collage cell. For example, if the area of the cropped portion of the video frame is larger than the area of the collage cell, then it may not be possible to avoid letter or pillar boxing while maintaining the original aspect ratio of the video frame. Thus, magnification is only needed when the area of the cropped portion is smaller or larger than the collage cell, to extend at least one dimension of the cropped portion to the edge of the cell. Numerous configurations and variations will be apparent in light of this disclosure.

Figure 2:
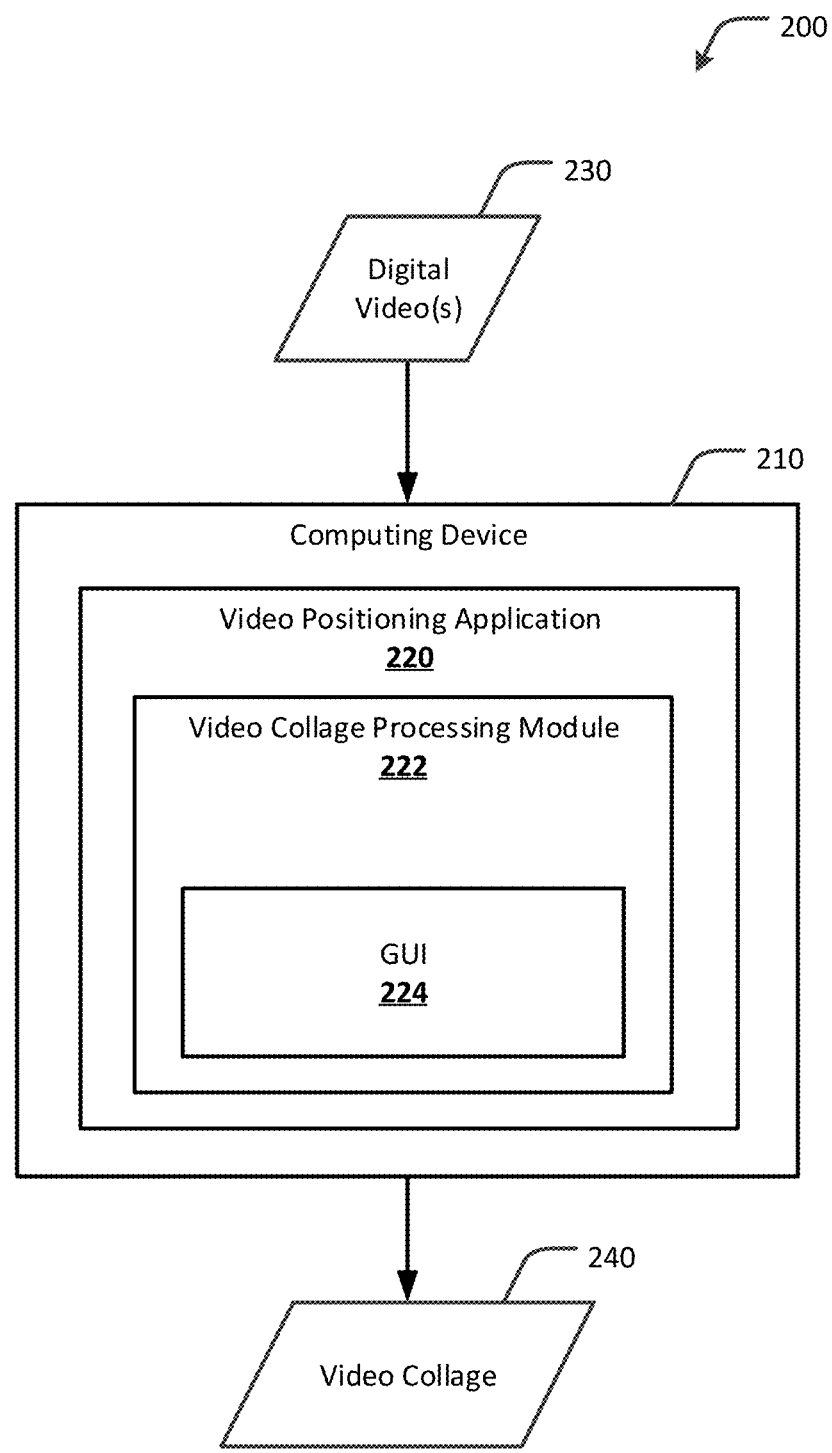
FIG. 2 shows an example system for positioning a video frame in a collage cell, in accordance with an embodiment of the present disclosure.

FIG. 2 shows an example system 200 for positioning a video frame in a collage cell, in accordance with an embodiment of the present disclosure. The system 200 includes a computing device 210 having one or more processors configured to execute a video positioning application 220. The application 220 includes a video collage processing module 222 and a graphical user interface (GUI) 224, each of which is executable, controllable, or both, by one or more processors of the computing device 210. The video positioning application 220 is configured to receive one or more digital videos 230 or other media content, and to generate a video collage 240 based on the digital video(s) 230 (i.e., positions video(s) 230 within one or more collage cells). The video collage can be displayed via the GUI 224, such as shown, for example, in FIG. 12.

More particularly, in an embodiment, the digital video(s) 230 include several video frames each depicting images that when displayed in sequence form a moving image. Each video frame may include, for example, images of people or objects. Some of the people and objects in the video may appear stationary over a period of time, while other people or objects may appear to move or change position within the frame (e.g., such as when the camera is panning across a scene). The video positioning application 220 is configured to receive a sequence of frames of the digital video(s) 230, identify human faces or objects in each frame, and automatically position each frame such that it fits within a cell of a collage while keeping certain visual elements (e.g., faces, objects and activity) visible within the cell and while maintaining the original aspect ratio of the video. For example, depending on the content of each video frame, the positioning can include cropping the frame to fit within the collage cell, adjusting the magnification of the frame to fit within the collage cell, or both. Further details of this process are described below with respect to FIGS. 3-12. Although FIG. 2 depicts a single computing device 210, it will be understood that, in some embodiments, portions of the processing performed by the video positioning application 220 is distributed among multiple computing devices (e.g., a back-end server may be configured to perform some or all of the functions of the video collage processing module 222).

Figure 3:
FIG. 3 shows an example frame of a video.
Figure 4:
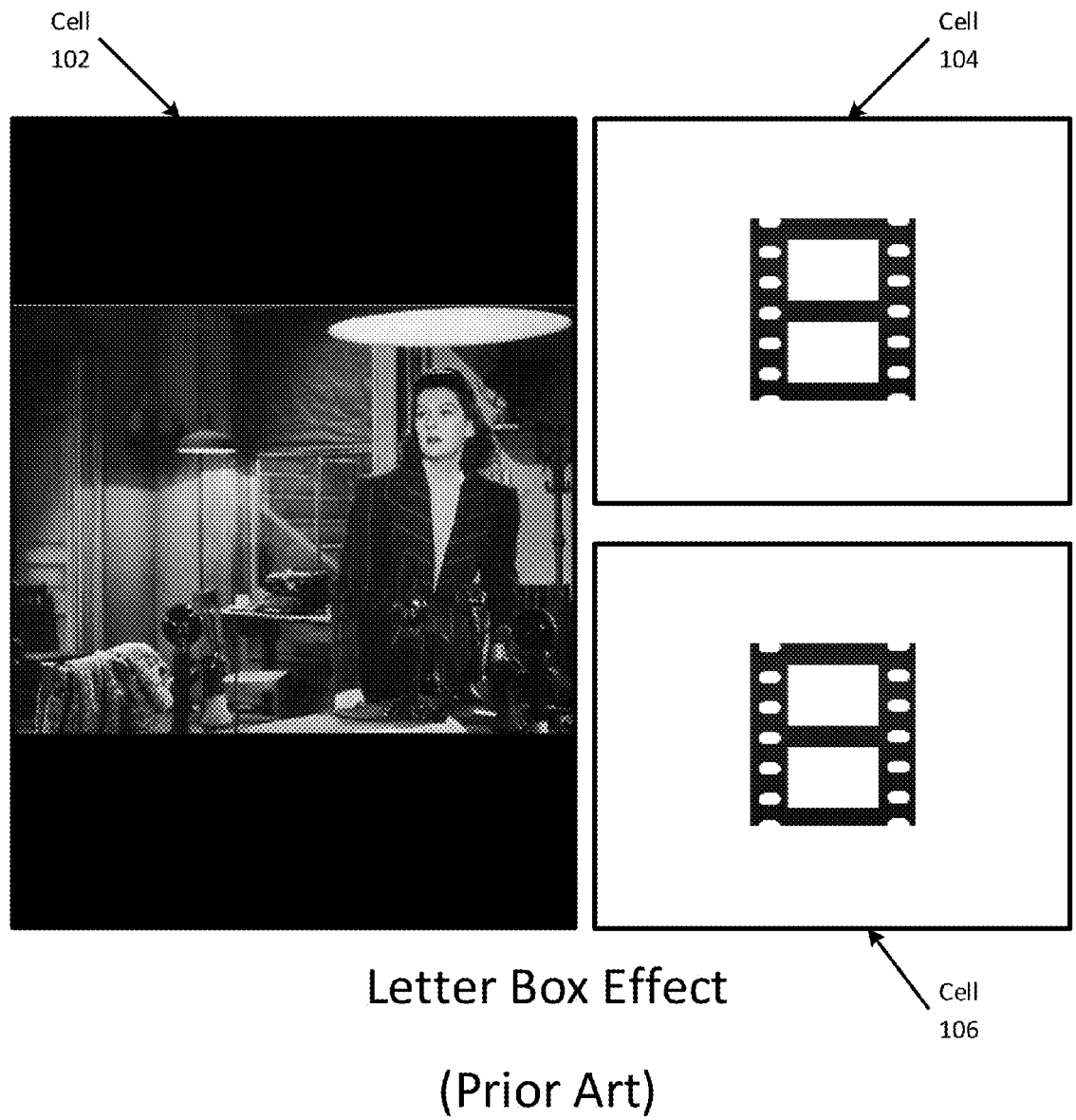
FIG. 4 shows the video frame of FIG. 3 resized to fit into one of the cells of the collage of FIG. 1.

FIG. 3 shows an example frame 302 of a video in its original, unmodified form, taken from a scene of a motion picture. When a user wishes to place the video into a cell of a collage, such as the collage shown in FIG. 1, each video frame (such as frame 302) must be individually modified or adjusted to fit into the size and shape of the collage cell, if different than the original video frame. Several disadvantages are found with some existing techniques for placing videos into a collage. For instance, FIG. 4 shows the video frame 302 of FIG. 3 resized to fit into one of the cells 102 of the collage of FIG. 1. As can be seen in FIG. 4, the example video frame 302 has been proportionally resized to fit into the cell 102, which is taller than the video frame 302. Also in FIG. 4, the example video frame 302 is shown with a letter box effect (black bars above and below the frame) to fill in the unused portions of the cell 102. While the resizing technique of FIG. 4 preserves the entire frame 302 as well as the original aspect ratio of the frame 302, the frame 302 has been reduced in size and is more difficult to view in the collage.

Figure 5:
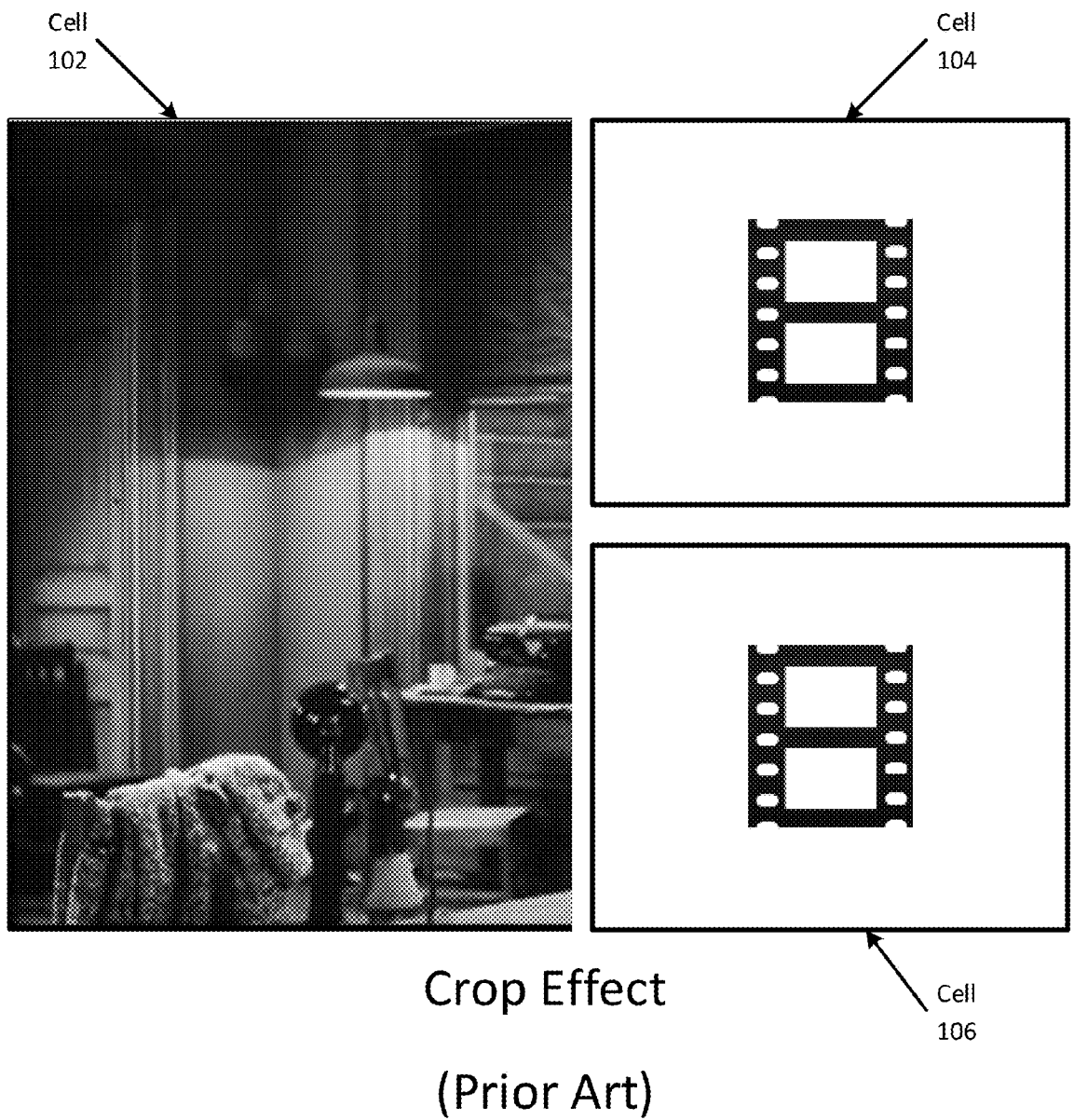
FIG. 5 shows the video frame of FIG. 3 cropped to fit into one of the cells of the collage of FIG. 1.

If the video frame 302 is not resized to fit into the cell 102, only a portion of the frame is visible in the collage cell 102 at the frame's original aspect ratio, such as shown in FIG. 5. This is called a crop effect, since the portion of the video frame 302 that does not fit into the cell 102 is cropped out. As can be seen in FIG. 5, however, the portion of the video frame 302 containing a face, which includes the actress on the right hand side, is not visible in the cell 102.

To avoid the disadvantages of the resizing and cropping effects discussed above, some existing techniques utilize frame position adjustments performed manually on a frame-by-frame basis. For example, a user can manually resize, reposition, and crop each video frame to fit into a collage cell, one frame at a time. However, such manual techniques can be very time-consuming and cumbersome, and can also lead to jerkiness during video playback when successive video frames are re-positioned by too great a distance or are panned or zoomed with too much variation with respect to one another.

To this end, and in accordance with various embodiments of the present disclosure, techniques are provided for positioning each frame of a video to fit within a collage cell while maintaining the frame's original aspect ratio, and such that there are no letter or pillar boxing effects, such that areas of the video containing certain visual elements (e.g., faces, objects and activity) is mostly visible, and such that the video can be played back without distracting jerkiness. In general, these techniques automatically resize and adjust the position of each video frame such that at least the areas of content containing the visual elements are visible within a collage cell. Further, the adjustments are made such that, during playback, the transitions between frames of the video are relatively smooth and free of visual discontinuities. Several example embodiments are discussed in further detail with respect to FIGS. 6-13.

In an embodiment, for each of a plurality of video frames, one or more polygons (e.g., a rectangle or other suitable polygon) are generated. Each polygon encompasses a portion of the respective video frame having at least one visual element. The visual element may include, for example, a human face, an object visible in the frame, and any portion of the frame exhibiting activity (e.g., portions of the frame that change visually from frame to frame). The object may be static (e.g., the object does not appear to move) or dynamic (e.g., the object appears to move).

Figure 6:
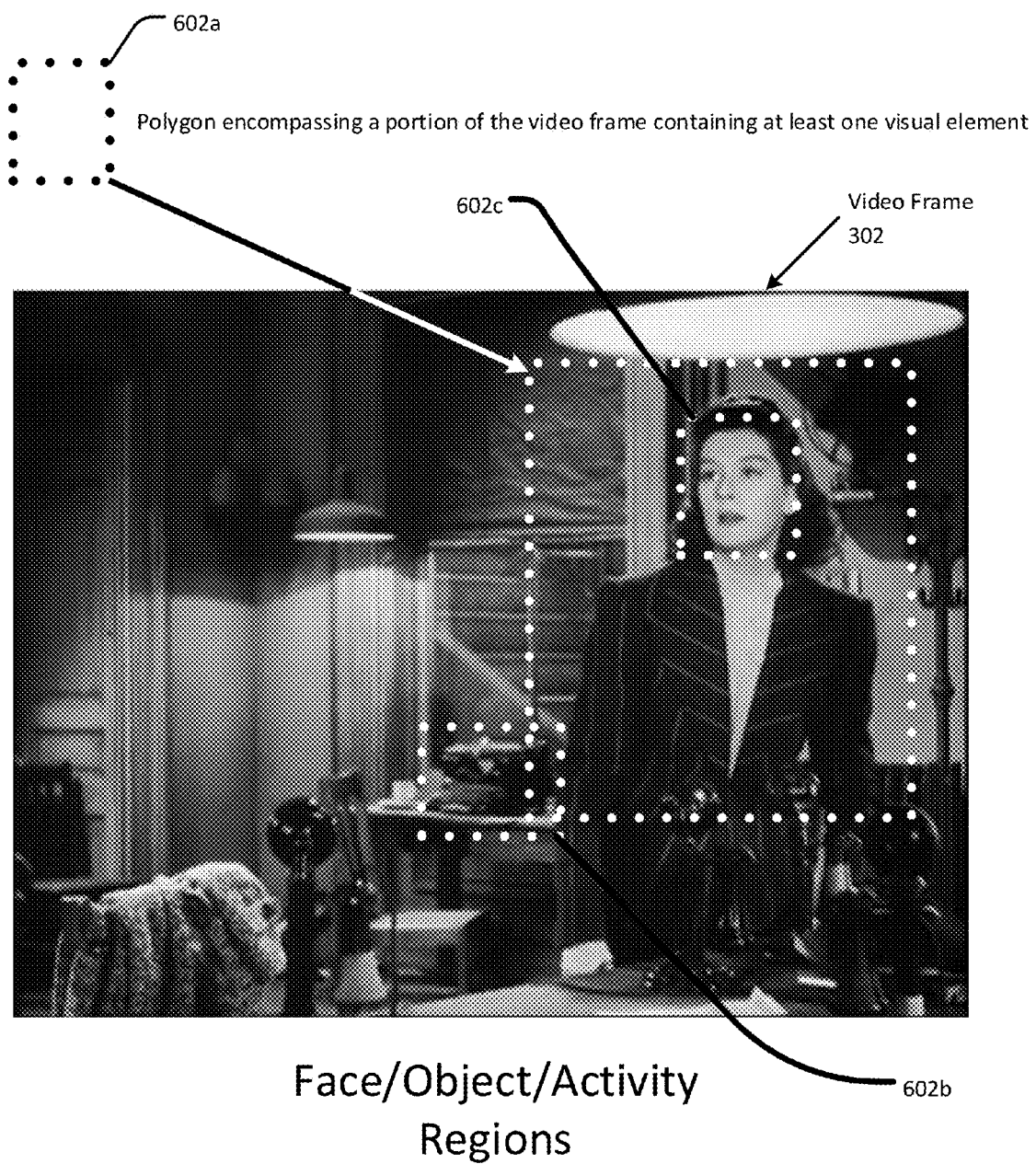
FIG. 6 shows several example polygons associated with the video frame of FIG. 3, in accordance with an embodiment of the present disclosure.

FIG. 6 shows the original, unmodified video frame 302 of FIG. 3 with several example polygons 602a-c superimposed over the image, in accordance with an embodiment of the present disclosure. The example polygons 602a-c variously shown in the drawings are provided for explanatory purposes and are not necessarily displayed to the user. However, in some embodiments, one or more of the polygons can be displayed to the user. In FIG. 6, three such example polygons 602a-c are shown: one encompasses the face of the actress (a human face), one encompasses a typewriter on a desk behind the actress (a static object that does not exhibit motion from frame to frame), and one encompasses the head and upper torso of the actress (a dynamic object that exhibits motion or other activity from frame to frame). It will be understood that additional or alternative polygons can be generated for any number of visual elements appearing in the video frame. It will be further understood that existing face and object detection algorithms can be used to locate and identify the visual elements or the visual elements can be manually selected by the user, as will be appreciated by one of skill in the art.

Figure 7:
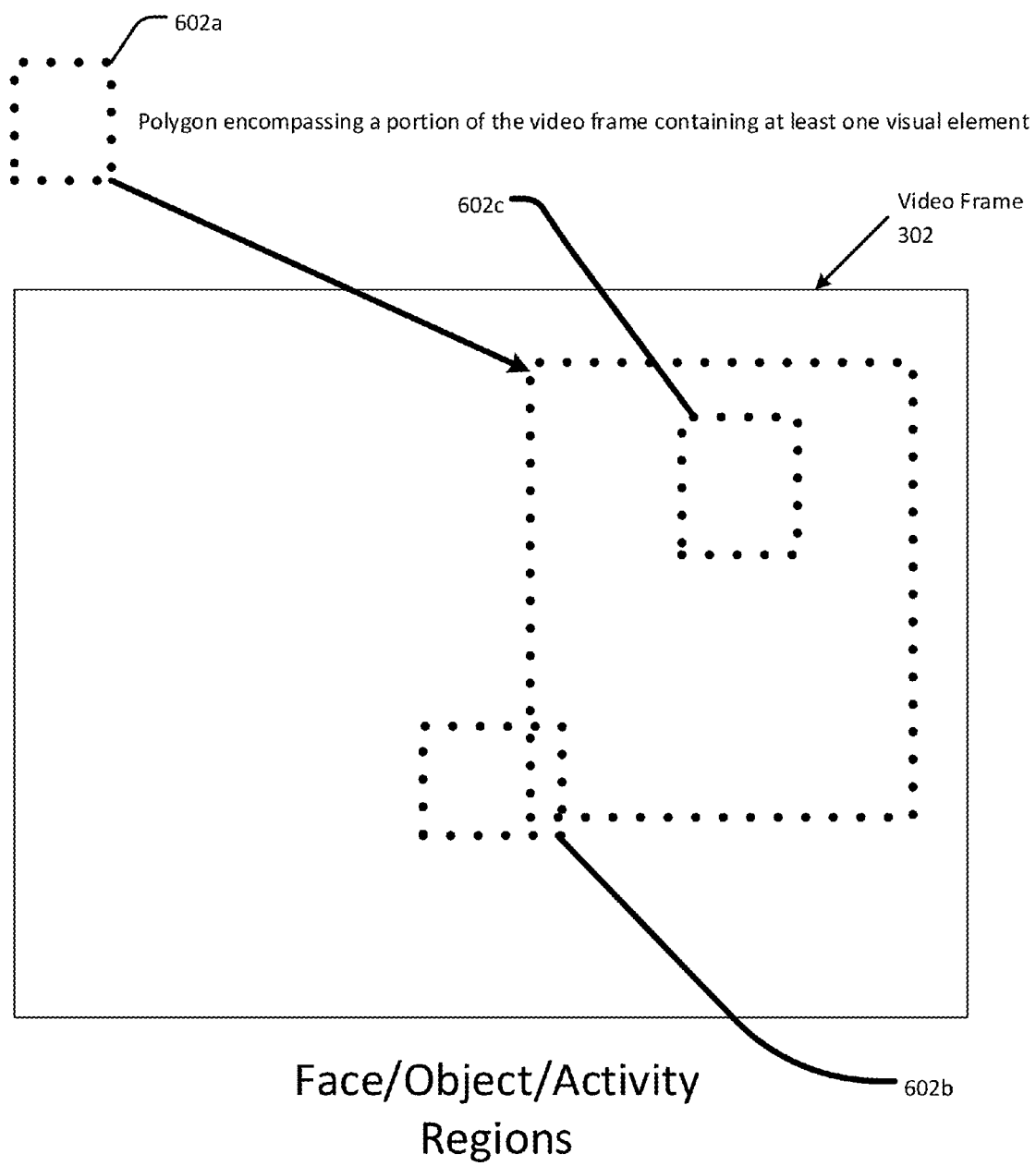
FIG. 7 shows the example polygons of FIG. 6 without the video frame, in accordance with an embodiment of the present disclosure.
Figure 8:
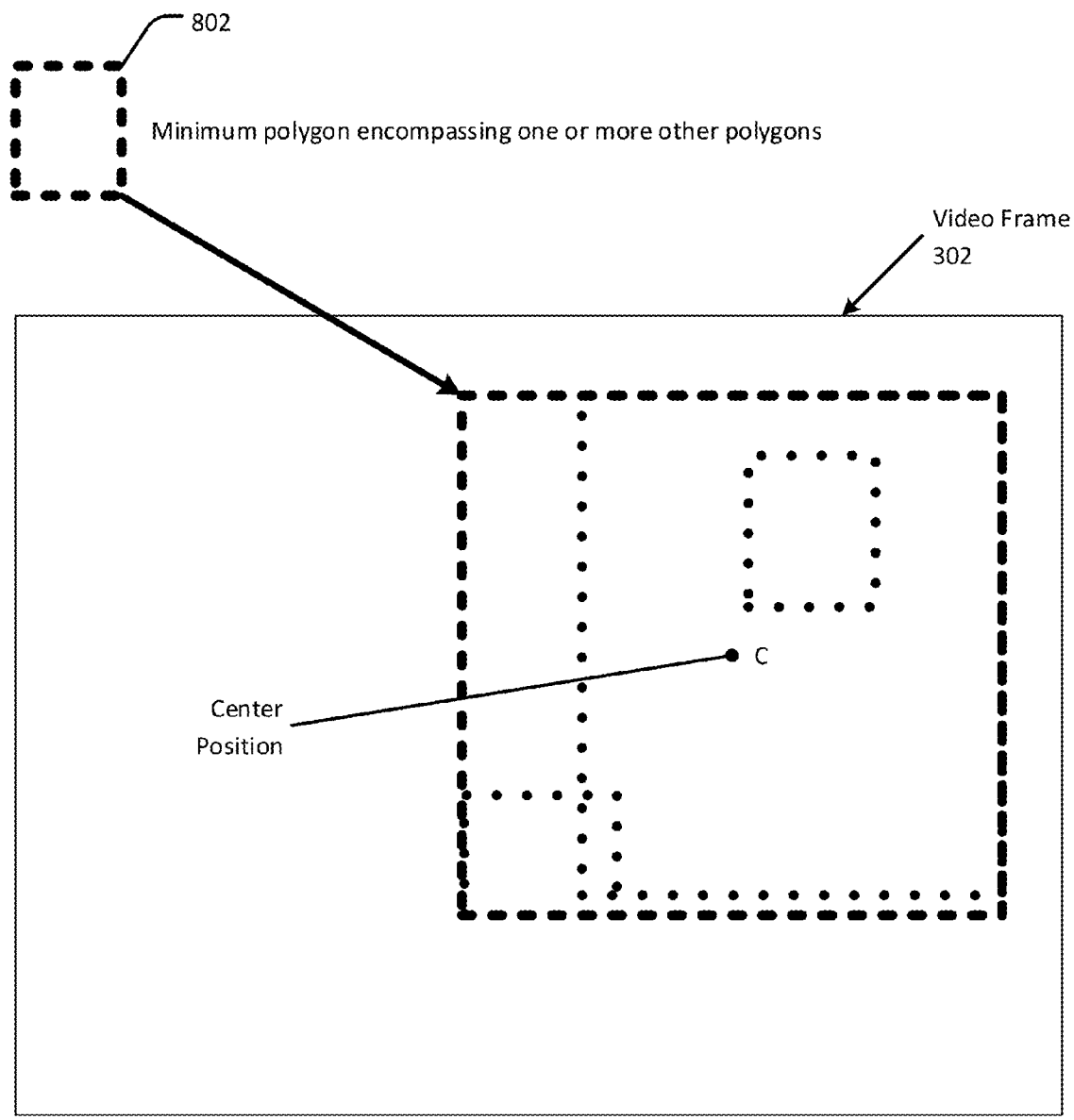
FIG. 8 shows an example minimum polygon associated with the video frame of FIG. 3, in accordance with an embodiment of the present disclosure.
Figure 9:
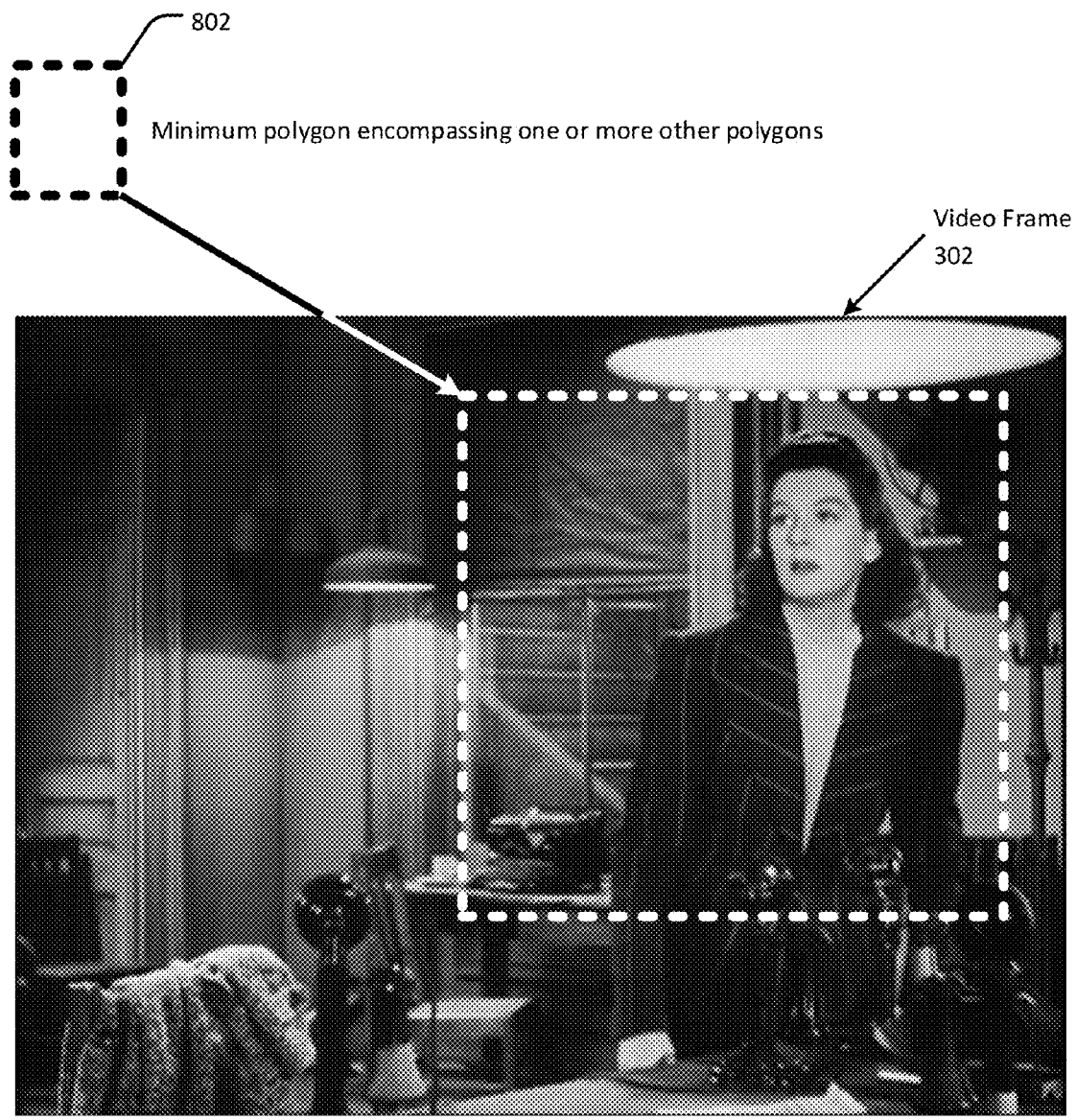
FIG. 9 shows the example minimum polygon of FIG. 8 superimposed over the video frame of FIG. 3, in accordance with an embodiment of the present disclosure.

FIG. 7 shows the example polygons 602a-c of FIG. 6 without the video frame 302 for clarity, in accordance with an embodiment of the present disclosure. As can be seen, although the polygons 602a-c encompassing different visual elements in the video frame 302 may overlap, they are not necessarily coextensive. Thus, in accordance with an embodiment, a so-called minimum polygon can be generated that completely or substantially encompasses all or some of the other polygons 602a-c, such as shown in the example of FIG. 8 (minimum polygon 802). For reference, FIG. 9 shows the example minimum polygon 802 of FIG. 8 superimposed over the video frame of FIG. 3, in accordance with an embodiment of the present disclosure. As can be seen, the minimum polygon 802 encompasses the face, head and upper torso of the actress, as well as the typewriter in the background, which are all of the visual elements identified in the above example of FIG. 6.

Figure 12:
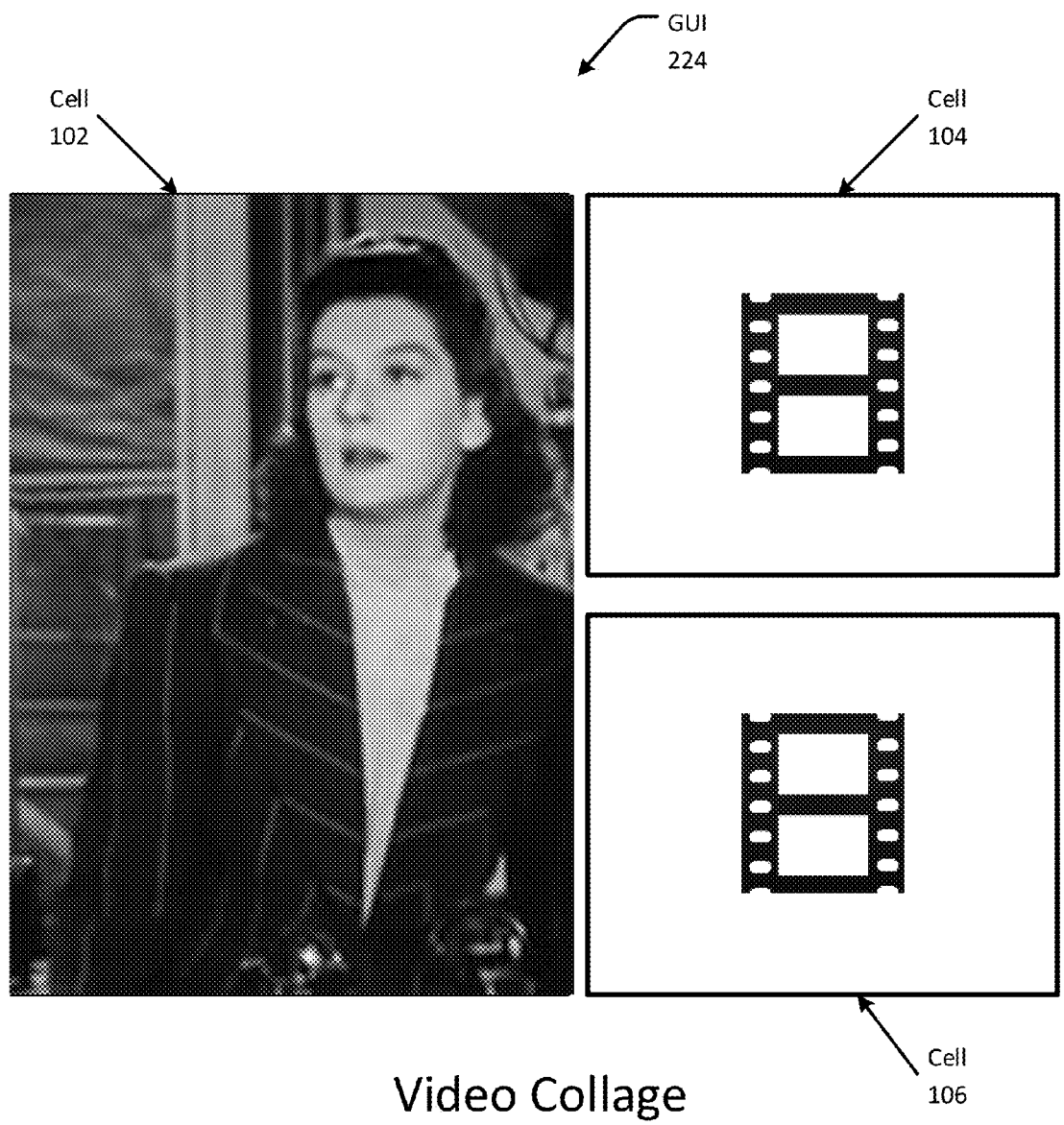
FIG. 12 shows an example video collage as displayed within a graphical user interface, in accordance with an embodiment of the present disclosure.

The minimum polygon 802 serves as the basis for determining which portion of the video frame 302 to display in the collage cell 102. For example, at least a portion of the video frame 302 encompassed by the minimum polygon 802 may be displayed in the collage cell 102, while the remaining portion of the video frame 302 is not displayed. The portion of the video frame 302 that is displayed in the collage cell 102 is constrained by the shape and size of the minimum polygon 802 such that the area of the minimum polygon 802 is less than or equal to the area of the collage cell 102. In some other embodiments, however, the area of the minimum polygon can be larger than the area of the collage cell, depending on the size and shape of the collage cell and the content of the video frame. In any event, in cases where the area of the minimum polygon is different than the area of the collage cell, the portion of the video frame 302 encompassed by the minimum polygon 802 can be magnified (zoomed in or out) accordingly to fit within the collage cell. Such magnification may cause portions of the video frame encompassed by the minimum polygon 802 to be cropped out to fit within the collage cell, such as shown in FIG. 12.

As shown in FIG. 8, the minimum polygon has a center position C, which may be at or proximate to the actual center of the polygon 802, although in some embodiments other reference points inside or outside of the polygon 802 may be used, as will be appreciated in view of the present disclosure. In general, the center position C of the minimum polygon 802 serves as a reference for the center position of the portion of the video frame 302 to be displayed in a collage cell 102.

The process of generating a minimum polygon for a video frame, such as described with respect to FIGS. 6-9, can be repeated for each video frame in a sequence of frames. However, as motion of faces and objects occurs from frame to frame during video playback, the center position C and the size of the minimum polygon for each frame 802 may be different than other frames, thereby resulting in a different reference point for displaying each frame in the collage cell. For instance, in a sequence of frames $F_1$ through $F_n$, the respective minimum polygons can have center positions $C_1$ through $C_n$ corresponding to points within the video frame. The center positions (e.g., $C_1$, $C_2$) may be the same from one frame (e.g., $F_1$) to the next successive frame (e.g., $F_2$), or these center positions may be different, depending on the relative change in positions of the content within the frames.

Such changes in the center position $C_{1-n}$ of the minimum polygon from frame to frame $F_{1-n}$, without compensating for those changes, may cause the video playback within the collage cell to become uneven or jerky. Therefore, in accordance with an embodiment of the present disclosure, the center position of certain minimum polygons can be adjusted to compensate for the frame-to-frame changes in center positions by computing the average center position C' of several minimum polygons (e.g., the minimum polygons of up to k consecutive video frames), and then changing, on a frame-by-frame basis, the center position of the minimum polygon from the original center position C to the average center position C'. The natural result of averaging of the center positions of the minimum polygons is to reduce or eliminate jerkiness and visual discontinuities between frames by limiting the amount of displacement of the new, or adjusted, center position C' for a given polygon relative to the original center position C of that polygon.

Figure 10:
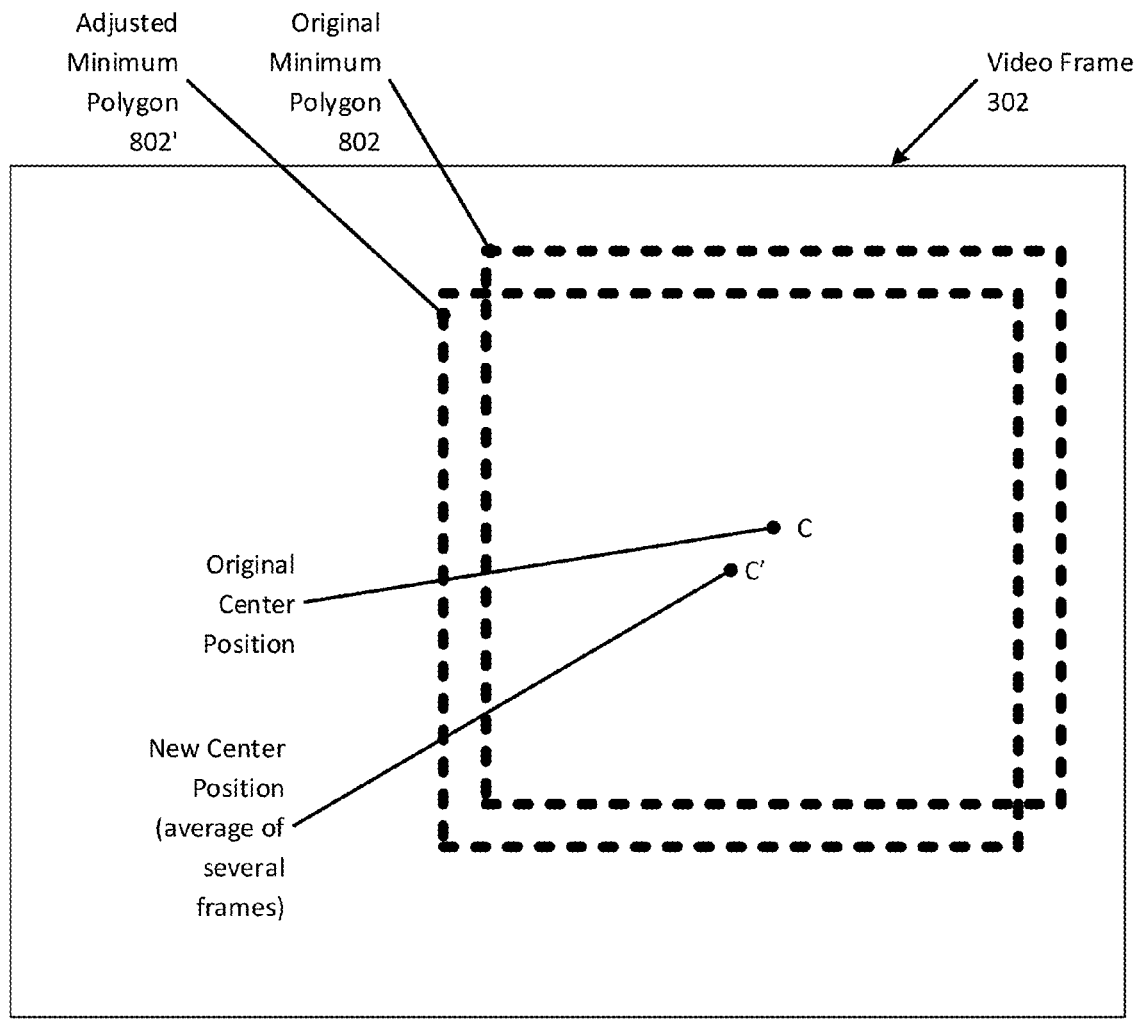
FIG. 10 shows an example adjusted minimum polygon associated with the video frame of FIG. 3, in accordance with an embodiment of the present disclosure.

FIG. 10 shows an example representation of the original center position C of the minimum polygon 802 of FIG. 8 adjusted to the average center position C', in accordance with an embodiment of the present disclosure. The adjusted minimum polygon 802' is shown in FIG. 10 and is the same size and shape as the original minimum polygon 802. The original (unadjusted) minimum polygon 802 (FIG. 8) has a center position C corresponding to a first point within the video frame 302. The center position C of the original minimum polygon of the video frame 302 is then changed to a new center position C' based at least in part on an average center position of minimum polygons generated for at least two consecutive video frames containing the same visual elements as in the original minimum polygon 802. As noted above, jerkiness and visual discontinuities are reduced or eliminated by adjusting the center position to the average center position of the minimum polygons of several successive frames (e.g., up to 60 frames or another user-configurable number of frames) rather than adjusting the center position to the actual center position of the minimum polygon in the successive frame. The minimum polygons for each of the other video frames can be precomputed or computed separately. The new center position C' corresponds to a second point within the given video frame 302, which may be the same as the first point, or a different point within the frame 302. The new center position C' may, for example, be coincident with a center position of the collage cell.

Next, a portion of the video frame 802 encompassed by the adjusted minimum polygon 802' having the new center position C' is cropped from the video frame 302 and displayed within a collage cell 102 of a graphical user interface 224. In some embodiments, if the size and shape of the adjusted minimum polygon 802' is different than the size and shape of the collage cell 102, a magnification of the cropped portion of the video frame 302 is applied such that the cropped portion extends to at least one edge of the respective collage cell without changing the original aspect ratio of the video frame 302 (e.g., to avoid or minimize a letter or pillar boxing effect). In an embodiment, the magnification, or zoom, level is limited to two times (2×) the original resolution to limit the appearance of blur and pixilation. However, in practice the limit of 2× magnification is typically not reached because for high definition video the size of the collage cell 102 is generally smaller than the resolution of the video. For example, the magnification level may typically fall between approximately 1.1× and 1.3× in some applications, depending on the content of the video frame 302 and the size of the collage cell 102. Further, in some embodiments, existing deblur/denoise and upscale effects can be applied to the video frame 302 to improve the quality of the video after magnification.

Figure 11:
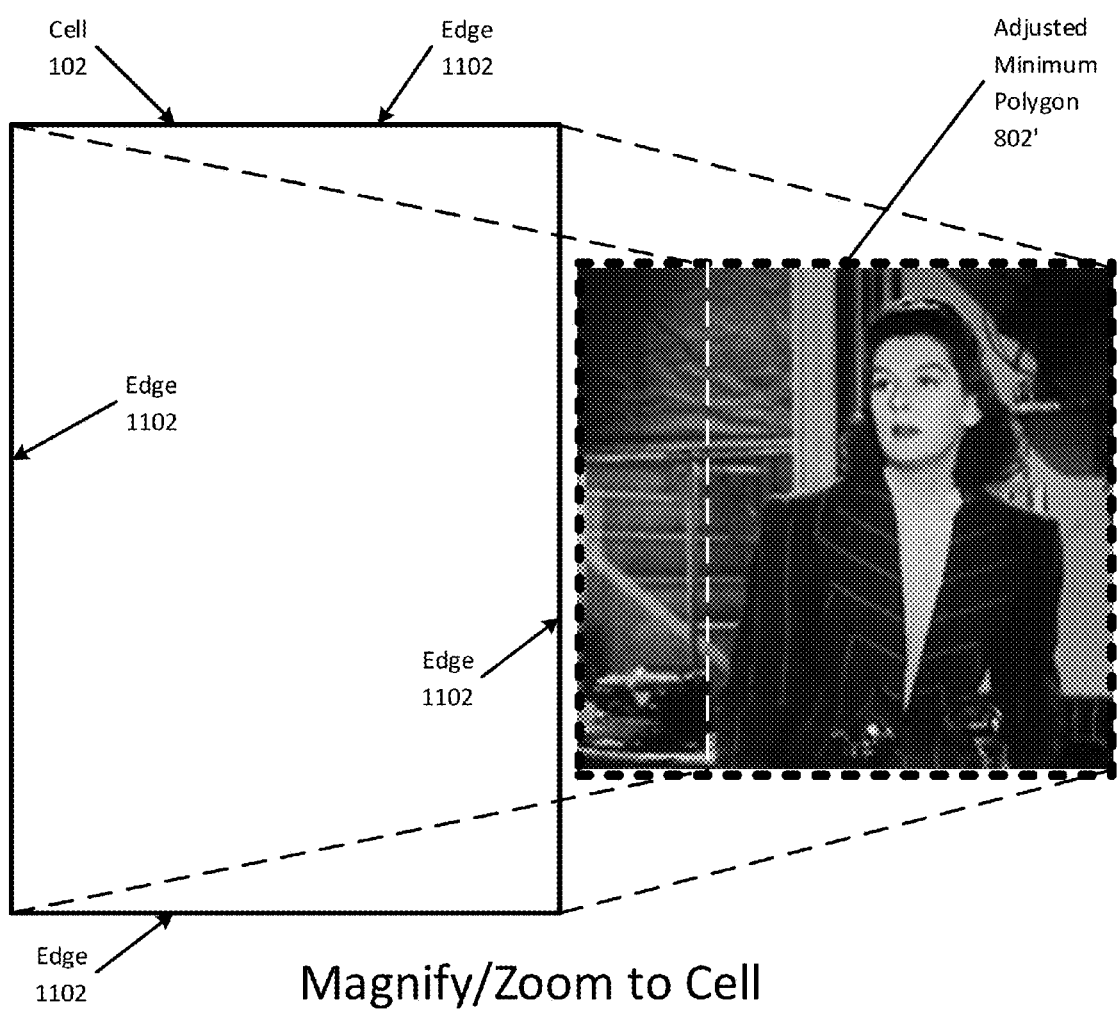
FIG. 11 shows an example portion of the video frame of FIG. 3 encompassed by the adjusted minimum polygon of FIG. 10 cropped and magnified to fit within the collage cell of FIG. 1, in accordance with an embodiment of the present disclosure.

FIG. 11 shows an example portion of the video frame 302 of FIG. 3 encompassed by the adjusted minimum polygon 802' of FIG. 10 cropped and magnified to fit within the collage cell 102 of FIG. 1, in accordance with an embodiment of the present disclosure. As can be seen in FIG. 11, the cropped portion is magnified to extend to at least one edge 1102 of the collage cell 102, and letter boxing or pillar boxing effects are not used or needed in this example. It will be understood that by so magnifying the cropped portion of the frame, some of the frame may not fit within the cell 102 and therefore is not visible, such as shown in FIG. 12. Alternatively, letter or pillar boxing effects may be used so that the entire cropped portion of the frame fits within the cell 102.

FIG. 12 shows the video collage of FIG. 1 as displayed within a graphical user interface 224, after the video frame 302 of FIG. 3 has been cropped, magnified (if needed) and positioned within cell 102. The example of FIG. 12 can be obtained using the techniques described herein.

Figure 13A:
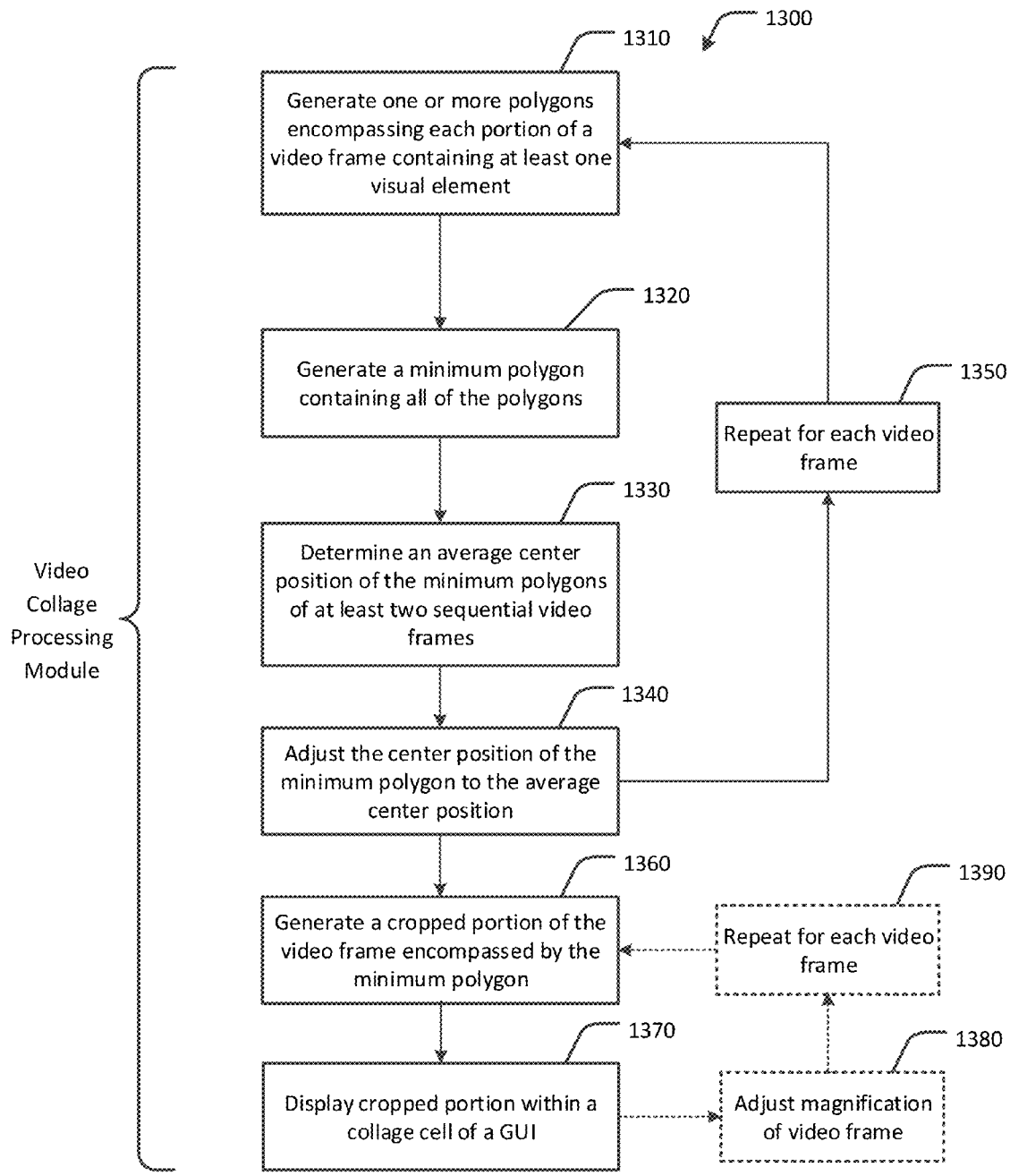
FIG. 13A shows an example methodology for positioning a video frame in a collage cell, in accordance with an embodiment of the present disclosure.

FIG. 13A shows an example methodology 1300 for positioning a video frame in a collage cell, in accordance with an embodiment of the present disclosure. All or parts of the method 1300 may be implemented, for example, in the video collage processing module of FIG. 1. The method 1300 includes generating 1310, for each of a plurality of video frames, one or more polygons encompassing each portion of the respective video frame containing at least one visual element. The visual element may include, for example, one or more human faces, one or more static objects (e.g., the object does not appear to move) visible in the frame, or one or more dynamic objects (e.g., the object appears to move) visible in the frame.

Figure 13B:
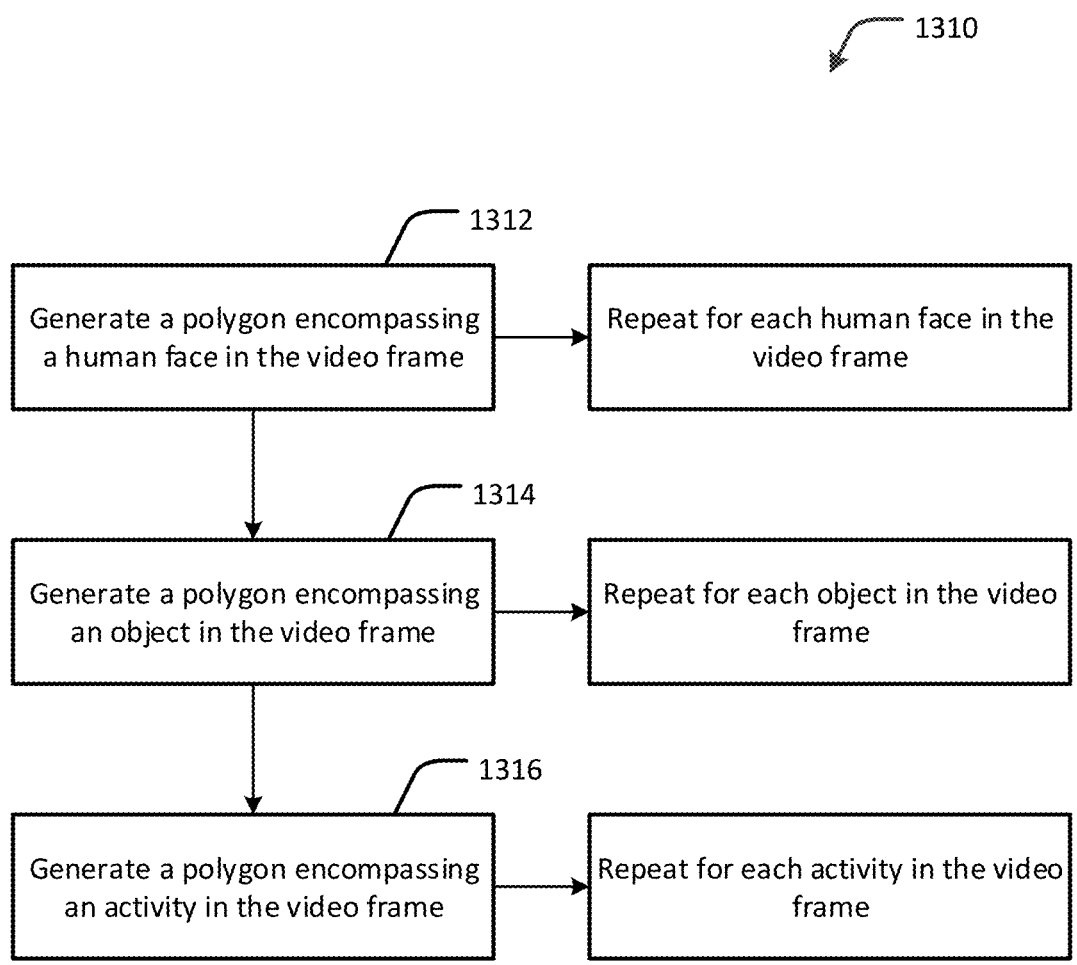
FIG. 13B shows an example methodology for generating one or more polygons in a video frame, in accordance with an embodiment of the present disclosure.

FIG. 13B shows an example of the methodology for generating 1310 the polygons, in accordance with an embodiment. As noted above, a polygon is generated for each visual element in each video frame. For instance, a polygon is generated 1312 for each human face appearing in the video frame (if any), a polygon is generated 1314 for each object appearing in the video frame (e.g., an object that does not appear to move from frame to frame, if any), and a polygon is generated 1316 for each activity appearing in the video frame (e.g., an object that appears to move from frame to frame, if any). The process for generating the polygons can be repeated for each frame of the video.

Referring again to FIG. 13A, the method 1300 further includes generating 1320, for each video frame, a minimum polygon containing all of the polygons in the respective video frame. A minimum polygon $P_n$ (for the $n^{th}$ frame in a sequence of the frames) may encompass all or some of the visual elements. In an embodiment, the area of the minimum polygon is less than or equal to the area of the collage cell. The minimum polygon has a center position corresponding to a first point within the respective video frame.

The method 1300 further includes determining 1330, for each of the video frames, an average center position of the minimum polygons of at least two sequential video frames including the respective video frame. The method 1300 further includes adjusting 1340, for each of the video frames, the center position of the minimum polygon of the respective frame to the average center position of minimum polygons. For example, the average center position $C_n'=$ (average of $(C_{n-k}, C_{n-k-1}, C_{n-k+2}, \ldots, C_{n-1})+C_n)/n$, where n is the number of frames and k denotes a non-zero block of k sequential frames (e.g., k=60, but may be user-configurable to any positive, integer value). The average center position of the adjusted minimum polygon $P_n'$ is the average center position $C_n'$ (e.g., $P_n'$ is moved by an amount equal to $C_n'-C_n$). The average center position corresponds to a second point within the given video frame, which may be the same as the first point, or a different point within the frame. The average center position may, for example, be coincident with a center position of the respective collage cell. One or more of the acts 1310, 1320, 1330, and 1340 can be repeated 1350 recursively for each video frame. The adjustment 1340 may occur at any point in the method 1300 after the polygon is generated 1310.

The method 1300 further includes generating 1360, for a given video frame, a cropped portion of the given video frame encompassed by the polygon having the average center position, and displaying 1370 the cropped portion of the given video frame within a collage cell of a graphical user interface. In some embodiments, the method 1300 includes adjusting 1380 a magnification of the given video frame is adjusted such that the cropped portion extends to at least one edge of the respective collage cell (e.g., to avoid or minimize a letter or pillar boxing effect). One or more of the acts 1360, 1370 and 1380 can be repeated 1390 for each video frame.

Figure 14:
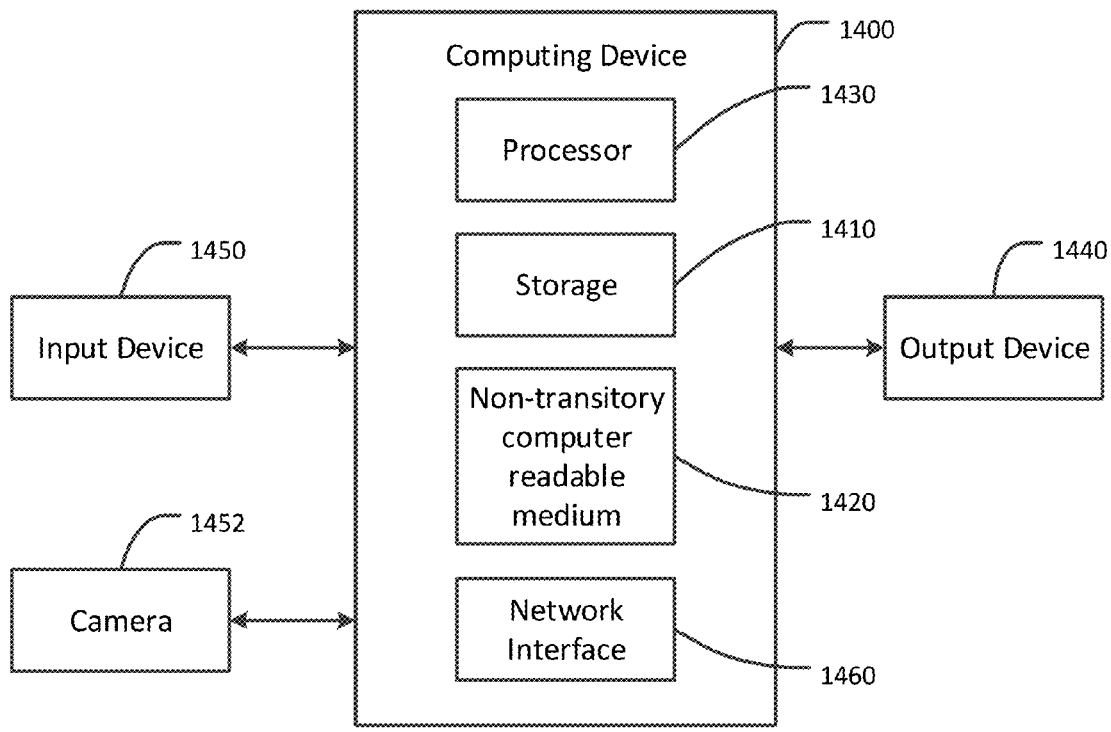
FIG. 14 is a block diagram representing an example computing device that may be used to perform any of the techniques as variously described in this disclosure.

FIG. 14 is a block diagram representing an example computing device 1400 that may be used to perform any of the techniques as variously described in this disclosure. For example, the system 200 of FIG. 2, or any portions thereof, and the methodologies of FIGS. 13A and 13B, or any portions thereof, may be implemented in the computing device 1400. The computing device 1400 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1400 includes one or more storage devices 1410 or non-transitory computer-readable media 1420 having encoded thereon one or more computer-executable instructions or software for implementing techniques as variously described in this disclosure. The storage devices 1410 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 1410 may include other types of memory as well, or combinations thereof. The storage device 1410 may be provided on the computing device 1400 or provided separately or remotely from the computing device 1400. The non-transitory computer-readable media 1420 may include, but are not limited to, one or more types of hardware memory, non-transitory tangible media (for example, one or more magnetic storage disks, one or more optical disks, one or more USB flash drives), and the like. The non-transitory computer-readable media 1420 included in the computing device 1400 may store computer-readable and computer-executable instructions or software for implementing various embodiments. The computer-readable media 1420 may be provided on the computing device 1400 or provided separately or remotely from the computing device 1400.

The computing device 1400 also includes at least one processor 1430 for executing computer-readable and computer-executable instructions or software stored in the storage device 1410 or non-transitory computer-readable media 1420 and other programs for controlling system hardware. Virtualization may be employed in the computing device 1400 so that infrastructure and resources in the computing device 1400 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1400 through an output device 1440, such as a screen or monitor, which may display one or more user interfaces provided in accordance with some embodiments. The output device 1440 may also display other aspects, elements or information or data associated with some embodiments. The computing device 1400 may include other I/O devices 1450 for receiving input from a user, for example, a keyboard, a joystick, a game controller, a pointing device (e.g., a mouse, a user's finger interfacing directly with a touch-sensitive display device, etc.), or any suitable user interface. The computing device 1400 may include other suitable conventional I/O peripherals, such as a camera 1452. The computing device 1400 includes or is operatively coupled to various suitable devices for performing one or more of the aspects as variously described in this disclosure.

The computing device 1400 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1400 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the video positioning application 220, the video collage processing module 222, the GUI 224, or any combination of these, is implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 1400, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of positioning a video frame within a collage cell. The method includes, for each of a plurality of video frames, generating, by a processor, one or more polygons encompassing each portion of the respective video frame containing at least one visual element; generating, by the processor, a minimum polygon containing all of the one or more polygons, the minimum polygon having a center position corresponding to a first point within the respective video frame; determining, by the processor, an average center position of the minimum polygons of at least two sequential video frames including the respective video frame; and adjusting, by the processor, the center position of the minimum polygon of the respective frame to the average center position of the minimum polygons, the average center position corresponding to a second point within the respective video frame, thereby producing an adjusted minimum polygon for the respective video frame. The method further includes, for a given video frame, generating, by the processor, a cropped portion of the given video frame encompassed by the adjusted minimum polygon; and displaying, by the processor, the cropped portion of the given video frame within a collage cell of a graphical user interface. In some cases, the method includes applying a magnification of the given video frame such that the cropped portion extends to at least one edge of the respective collage cell. In some cases, the average center position is coincident with a center position of the respective collage cell. In some cases, an area of the polygon is less than or equal to an area of the collage cell. In some cases, the first point within the respective video frame is the same as the second point within the respective video frame. In some cases, the first point within the respective video frame is different from the second point within the respective video frame. In some cases, the at least one visual element appears in the respective video frame as at least one of a human face, a static object, and a dynamic object.

Another example embodiment provides, in a digital medium environment for processing images, a system for positioning a video frame within a collage cell. The system includes a storage, and a processor operatively coupled to the storage. The processor is configured to execute instructions stored in the storage that when executed cause the processor to carry out a process including, for each of a plurality of video frames, generating one or more polygons encompassing each portion of the respective video frame containing at least one visual element; generating a minimum polygon containing all of the one or more polygons, the minimum polygon having a center position corresponding to a first point within the respective video frame; determining an average center position of the minimum polygons of at least two sequential video frames including the respective video frame; and adjusting the center position of the minimum polygon of the respective frame to the average center position of the minimum polygons, the average center position corresponding to a second point within the respective video frame, thereby producing an adjusted minimum polygon for the respective video frame. The process further includes, for a given video frame, generating a cropped portion of the given video frame encompassed by the adjusted minimum polygon; and displaying, by the processor, the cropped portion of the given video frame within a collage cell of a graphical user interface. In some cases, the process includes applying a magnification of the given video frame such that the cropped portion extends to at least one edge of the respective collage cell. In some cases, the average center position is coincident with a center position of the respective collage cell. In some cases, an area of the polygon is less than or equal to an area of the collage cell. In some cases, the first point within the respective video frame is the same as the second point within the respective video frame. In some cases, the first point within the respective video frame is different from the second point within the respective video frame. In some cases, the at least one visual element appears in the respective video frame as at least one of a human face, a static object, and a dynamic object. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of positioning a video frame within a collage cell, the method comprising:
    for each of a plurality of video frames:
    generating, by a processor, one or more polygons encompassing each portion of the respective video frame containing at least one visual element;
    generating, by the processor, a minimum polygon containing all of the one or more polygons, the minimum polygon having a center position corresponding to a first point within the respective video frame;
    determining, by the processor, an average center position of the minimum polygons of at least two sequential video frames including the respective video frame; and
    adjusting, by the processor, the center position of the minimum polygon of the respective frame to the average center position of the minimum polygons, the average center position corresponding to a second point within the respective video frame, thereby producing an adjusted minimum polygon for the respective video frame; and
    for a given video frame:
    generating, by the processor, a cropped portion of the given video frame encompassed by the adjusted minimum polygon;
    applying a magnification of the given video frame such that the cropped portion extends to at least one edge of the respective collage cell; and
    displaying, by the processor, the cropped portion of the given video frame within a collage cell of a graphical user interface.

2. The method of claim 1, wherein the average center position is coincident with a center position of the respective collage cell.

3. The method of claim 1, wherein an area of the polygon is less than or equal to an area of the collage cell.

4. The method of claim 1, wherein the first point within the respective video frame is the same as the second point within the respective video frame.

5. The method of claim 1, wherein the first point within the respective video frame is different from the second point within the respective video frame.

6. The method of claim 1, wherein the at least one visual element appears in the respective video frame as at least one of a human face, a static object, and a dynamic object.

7. In a digital medium environment for processing images, a system for positioning a video frame within a collage cell, the system comprising:
    a storage; and
    a processor operatively coupled to the storage, the processor configured to execute instructions stored in the storage that when executed cause the processor to carry out a process comprising:
    for each of a plurality of video frames:

generating one or more polygons encompassing each portion of the respective video frame containing at least one visual element;

generating a minimum polygon containing all of the one or more polygons, the minimum polygon having a center position corresponding to a first point within the respective video frame;

determining an average center position of the minimum polygons of at least two sequential video frames including the respective video frame; and adjusting the center position of the minimum polygon of the respective frame to the average center position of the minimum polygons, the average center position corresponding to a second point within the respective video frame, thereby producing an adjusted minimum polygon for the respective video frame; and for a given video frame:

generating a cropped portion of the given video frame encompassed by the adjusted minimum polygon;

applying a magnification of the given video frame such that the cropped portion extends to at least one edge of the respective collage cell; and displaying the cropped portion of the given video frame within a collage cell of a graphical user interface.

8. The system of claim 7, wherein the average center position is coincident with a center position of the respective collage cell.

9. The system of claim 7, wherein an area of the polygon is less than or equal to an area of the collage cell.

10. The system of claim 7, wherein the first point within the respective video frame is the same as the second point within the respective video frame.

11. The system of claim 7, wherein the first point within the respective video frame is different from the second point within the respective video frame.

12. The system of claim 7, wherein the at least one visual element appears in the respective video frame as at least one of a human face, a static object, and a dynamic object.

13. A non-transitory computer readable medium having instructions encoded thereon that when executed by one or more computer processors cause the one or more computer processors to perform a process comprising:

for each of a plurality of video frames:

generating one or more polygons encompassing each portion of the respective video frame containing at least one visual element;

generating a minimum polygon containing all of the one or more polygons, the minimum polygon having a center position corresponding to a first point within the respective video frame;

determining an average center position of the minimum polygons of at least two sequential video frames including the respective video frame; and adjusting the center position of the minimum polygon of the respective frame to the average center position of the minimum polygons, the average center position corresponding to a second point within the respective video frame, thereby producing an adjusted minimum polygon for the respective video frame; and for a given video frame:

generating a cropped portion of the given video frame encompassed by the adjusted minimum polygon;

applying a magnification of the given video frame such that the cropped portion extends to at least one edge of the respective collage cell; and displaying the cropped portion of the given video frame within a collage cell of a graphical user interface.

14. The non-transitory computer readable medium of claim 13, wherein the average center position is coincident with a center position of the respective collage cell.

15. The non-transitory computer readable medium of claim 13, wherein an area of the polygon is less than or equal to an area of the collage cell.

16. The non-transitory computer readable medium of claim 13, wherein the first point within the respective video frame is one of the same as the second point within the respective video frame and different from the second point within the respective video frame.

17. The non-transitory computer readable medium of claim 13, wherein the at least one visual element appears in the respective video frame as at least one of a human face, a static object, and a dynamic object.

* * * * *